March 9, 1971 J. E. DRAYSON 3,568,464
FREEZE BRANDING IRON

Filed March 10, 1969

INVENTOR
JAMES E. DRAYSON

BY *Griffin, Branigan and Kindness*

ATTORNEYS

March 9, 1971  J. E. DRAYSON  3,568,464

FREEZE BRANDING IRON

Filed March 10, 1969  2 Sheets-Sheet 2

INVENTOR
JAMES E. DRAYSON

BY *Griffin, Branigan and Kindness*

ATTORNEYS

United States Patent Office 3,568,464
Patented Mar. 9, 1971

3,568,464
FREEZE BRANDING IRON
James E. Drayson, Longmont, Colo.
(1144 Harvard Ave., Billings, Mont. 59102)
Filed Mar. 10, 1969, Ser. No. 805,440
Int. Cl. F25d 3/00
U.S. Cl. 62—293                                   7 Claims

ABSTRACT OF THE DISCLOSURE

This disclosure describes a freeze branding iron comprising a coolant reservoir having a brand configuration projecting outwardly from one side of the reservoir. A handle projects outwardly from the reservoir on the side opposite to the brand configuration side. The coolant reservoir holds a suitable refrigerant, such as a mixture of Dry-Ice and alcohol, for example.

BACKGROUND OF THE INVENTION

Branding of animals, particularly cattle, is the classical method of marking the animals for identification. The traditional method of branding is to heat the brand emblem end of an iron until it is sufficiently hot. The emblem is then pressed against the side of the animal to be branded. The hot end of the branding iron burns off the hair of the animal and also burns the skin of the animal so as to form a scar tissue over which hair does not grow back. It will be appreciated that this method of branding is laborious, time consuming and distasteful to the persons performing the branding. In addition, it may be painful to the animal being branded.

A more contemporary approach to branding is to place the brand emblem end of a branding iron in a refrigerant mixture. Usually, the branding iron is formed of copper or bronze instead of iron and the refrigerant is a mixture of Dry-Ice and alcohol. After the brand emblem end of the iron is cooled, it is pressed against the animal and causes depigmentation of the animal's hair. When the hair regrows, it is white and is in the shape of the brand emblem.

While the above method of branding eliminates some of the disadvantages of "hot" branding, it does not eliminate all of the disadvantages. For example, an unduly long period of time is required for the branding iron to cool to a sufficiently low temperature level. In addition, the iron can only be used for one brand before it must be re-cooled. That is, after the application of each brand, the iron must be re-cooled by reinsertion into the refrigerant mixture for a period of time. Moreover, the normal branding iron does not always produce an entirely satisfactory brand because it becomes warm before the animal is adequately branded. This, of course, requires a second application of the iron which leads to problems of registration between the first and second brands. These disadvantages make such branding both inadequate and time consuming and, therefore, costly. Hence, it is an object of this invention to provide a branding iron which is both inexpensive and portable as well as being adapted for relatively long term use so as to avoid frequent cooling operations and attendant registration problems caused by "overbrands."

A more recently proposed branding iron is formed of copper tubes connected to a Dewar filled with a liquid refrigerant such as nitrogen. The refrigerant flows through the tubes to cool the brand emblem mounted thereon. Because of the continuous flow of the refrigerant, the branding iron can be used for continuous branding. A prime disadvantage of this system is its expense. That is, in order to obtain satisfactory performance, the system requires an expensive Dewar, an expensive pressure regulation means and an expensive refrigerant.

Therefore, it is a more general object of this invention to provide a new and improved freeze branding iron.

It is a further object of this invention to provide a freeze branding iron that is inexpensive to manufacture and inexpensive to use.

It is a still further object of this invention to provide a freeze branding iron that is adapted to use inexpensive refrigerants.

It is a still further object of this invention to provide a new and improved freeze branding iron that can be used substantially continuously without having to be cooled between each branding operation.

SUMMARY OF THE INVENTION

In accordance with the principles of this invention, a new and improved freeze branding iron is provided which comprises a reservoir for retaining a suitable coolant or refrigerant. A handle is affixed to the reservoir which has a raised branding emblem on one side thereof. In this respect, the emblem is cast in a single unit and formed of a high-density copper so as to have a high thermal conductivity. The remaining sides of the reservoir are formed of a strap of copper and a copper cap with the entire structure being soldered together. An aperture is left in the strap for insertion of the coolant. In this manner, the reservoir is adapted to hold a suitable supply of Dry-Ice and alcohol mixture or some other similarly convenient coolant.

It will be appreciated from the foregoing summary of the invention that the new and improved freeze branding iron is uncomplicated and, therefore, inexpensive to manufacture. In addition, the branding iron has a low cost per brand use because it is adapted to use inexpensive refrigerants such as a Dry-Ice and alcohol mixture. Further, the iron is easy to use because it is small in size. For example, in one embodiment, the reservoir measure is 4 inches by 2 and ⅜ inches and has a ¾ inch raised branding emblem. Moreover, because the reservoir is located adjacent to the branding emblem, a large number of brands can be formed for each filling of the reservoir. Hence, the invention overcomes the above described disadvantages of the prior art.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings, wherein.

DESCRIPTION OF THE PREFERRED EMBODIMENTS

Figure 1:
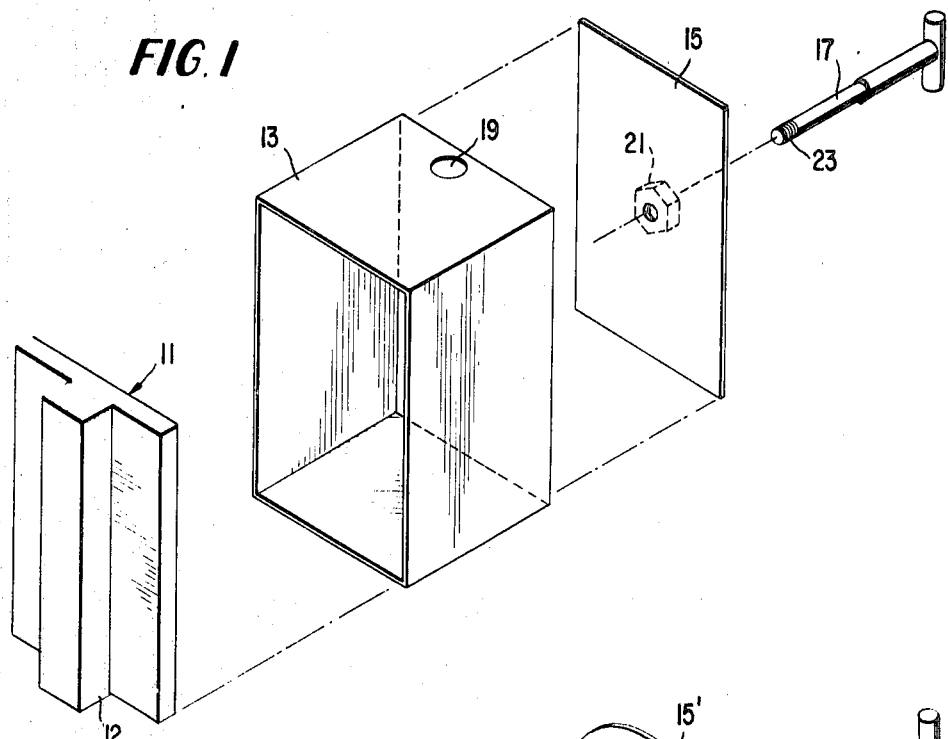
FIG. 1 is an exploded pictorial diagram of one embodiment of the invention.

Turning now to the drawings wherein like reference numerals designate like parts throughout the several views, FIG. 1 illustrates one embodiment of the invention and comprises: a brand emblem plate 11; a jacket 13; a back plate 15; and a handle 17. The brand emblem plate 11, for purposes of illustration, is rectangular and includes a brand emblem 12 in the form of a "1" projecting outwardly from one side of the plate. Preferably, the brand emblem plate is made of high density copper and is cast in one solid unit. The jacket 13 is in the form of a loop having a rectangular cross-section and the brand emblem plate fits into one of the open ends of the loop so that the brand emblem projects outwardly. The back plate 15 is also rectangular and fits into the other open end of the loop. In this manner, a closed container is provided which forms a reservoir for a coolant or refrigerant. An aperture 19 is located in the jacket at the top of the container to allow the coolant to enter the container. Preferably, the jacket 13 and the back plate are formed of copper.

The jacket 13, the brand emblem plate 11, and the back plate 15 are soldered together in any well-known manner, such as by silver soldering, for example. A nut 21 is affixed to the rear of the back plate 15 as illustrated by the dashed lines in FIG. 1. The handle 17 is generally T shaped having a threaded end 23 which screws into the nut 21.

From the foregoing description, it will be appreciated that the invention is a freeze branding iron comprising a container having a handle that projects outwardly from one side of the container. Projecting outwardly from the other side of the container is a brand emblem. In use, the container is filled by emersing it in a suitable coolant holder such as a vat filled with a mixture of Dry-Ice and alcohol. After the container is filled, it is removed and the brand emblem is pressed against the sides of the animals to be branded.

It has been found that using the branding iron of the invention, brands can be continuously applied for 30 minutes or more, depending upon the size of the reservoir. A suitable reservoir size is 4 inches in height, 2 and 3/8 inches in width, and 2 inches wide with a 3/4 inch rise for the branding emblem. Hence, the overall structure is relatively small and, therefore, easy to use.

It will be appreciated that the container can be filled in other ways than by immersing it in a vat or tank of coolant mixture. For example, the coolant can be inserted through the aperture 19 by a tube or other suitable dispensing means. In addition, refrigerants other than a mixture of Dry-Ice and alcohol can be used as the coolant. In any event, the above described structure is far less complex and expensive than those which must be attached to a costly Dewar vessel, while nevertheless maintaining the ability of prolonged use without refilling. Hence, the above described iron saves both time and money and produces a better brand than the conventional freeze branding irons which must be frequently cooled and often results in poorly registered overbrands.

Figure 2:
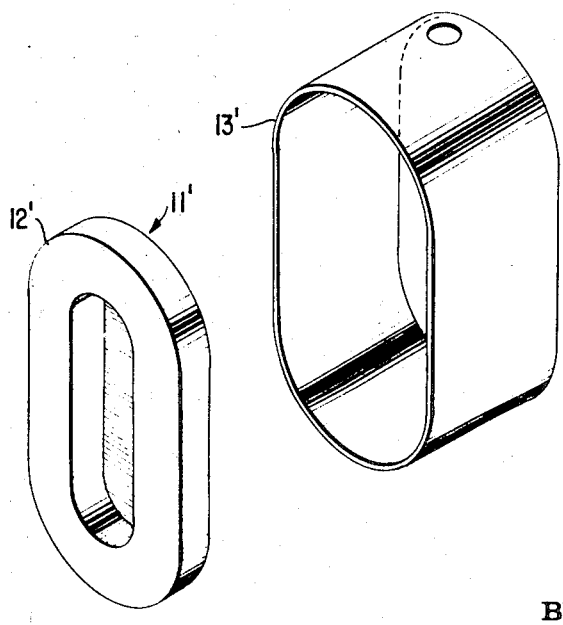
FIG. 2 is an exploded pictorial diagram of a further embodiment of the invention.
Figure 2:
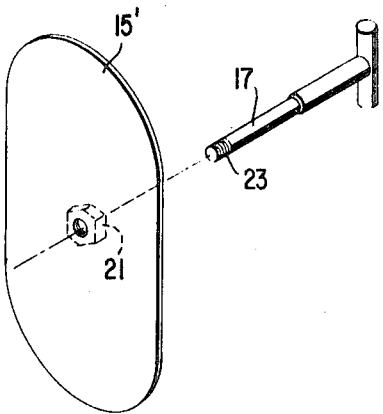

FIG. 2 illustrates an alternative embodiment of the invention wherein the brand emblem is an O. In this embodiment, the jacket 13' has an O-shaped cross-section and the brand emblem plate 11' is O-shaped. Hence, the O-shaped brand emblem 12' and the plate 11' fit into one end of the jacket. The back plate 15' is also O-shaped and the overall structure is soldered together as previously described with respect to the FIG. 1 embodiment. Other than these changes, the embodiment of the invention illustrated in FIG. 2 is formed the same as the embodiment of the invention illustrated in FIG. 1 and is used in a similar manner. However, FIG. 2 does illustrate that the container does not have to be generally square shaped but can take on any shape best adapted to the brand emblem to be used.

Figure 3:
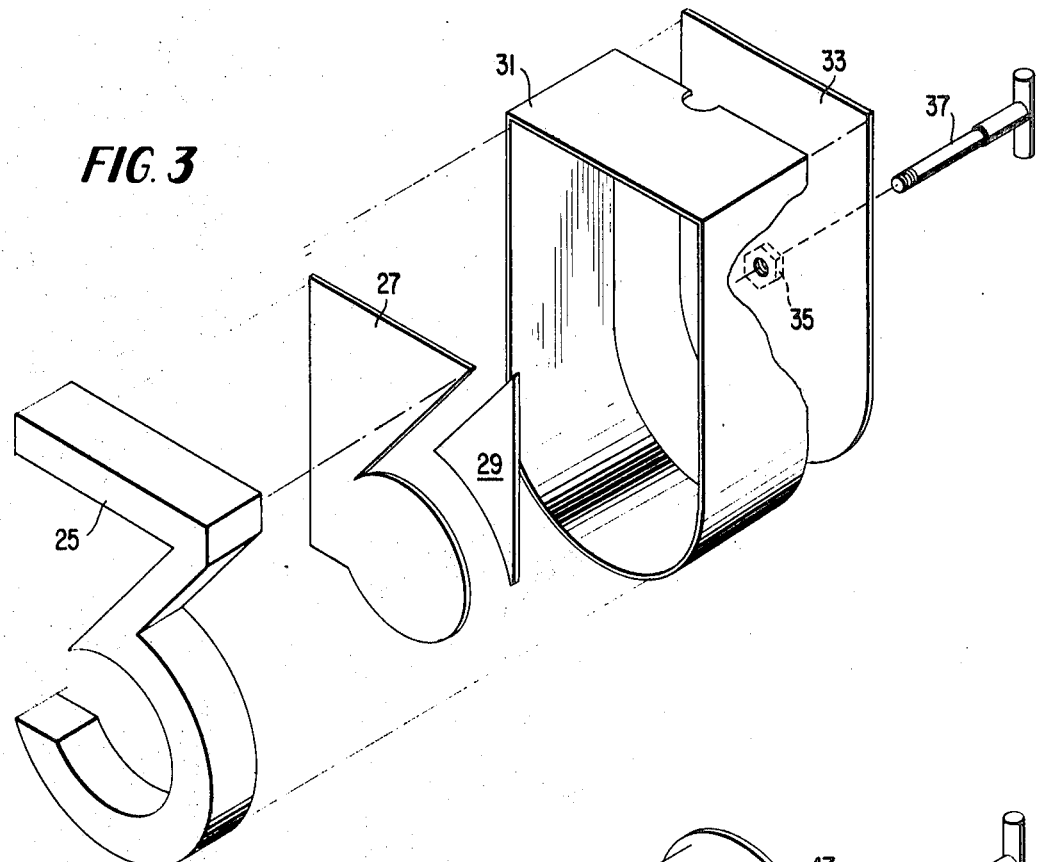
FIG. 3 is an exploded pictorial view of another embodiment of the invention.

FIG. 3 illustrates a further alternative embodiment of the invention formed slightly differently than the embodiments of the invention illustrated in FIGS. 1 and 2. The FIG. 3 brand emblem 25 is in the form of a "3." A first filler member 27 fits inside of the "3" emblem; and a second filler member 29 fits outside of the "3" emblem. These filler members 27 and 29 are fitted and silver soldered into their respective regions between the "3" and a jacket 31.

The jacket 31 has a cross-section having a square top and a curved bottom so as to allow the brand emblem and the filler members 29 and 27 to fit inside of an end thereof, as also illustrated in FIG. 3. Similarly, a back plate 33 has the silhouette of a squared top and a curved bottom.

As with the FIGS. 1 and 2 embodiments, the back plate fills in the other end of the jacket 31; and, as noted, the above described members are soldered together to form a container or reservoir having the brand emblem projecting outwardly from one side thereof. Preferably, the container elements are formed of copper and the brand emblem is formed of high density copper and cast as a single unit.

Also illustrated in FIG. 3 is a nut 35 attached to the back side of the back plate 33 and a threaded end of a handle 37. The nut 35 and the handle 37 are connected in the same manner as described with respect to the FIGS. 1 and 2 embodiments.

The embodiment of the invention illustrated in FIG. 3 is used in the same manner as the embodiments of the invention illustrated in FIGS. 1 and 2. More specifically, the jacket 31, the emblem 27, the filler members 27 and 29, and the back plate 35, form a reservoir which is filled with a suitabe coolant, such as a mixture of Dry-Ice and alcohol, for example. Thereafter, the branding iron is used for branding cattle or other animals by pressing the brand emblem against the sides of the animals.

Figure 4:
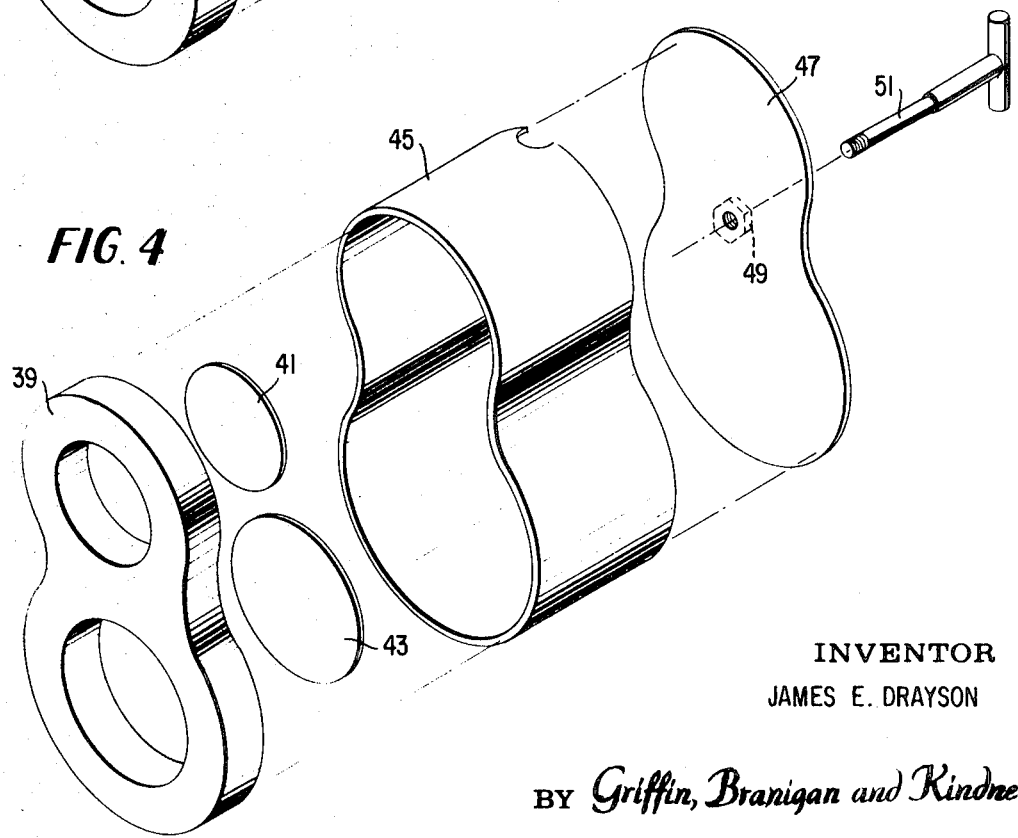
FIG. 4 is an exploded pictorial view of yet another embodiment of the invention.

FIG. 4 illustrates yet another embodiment of the invention wherein the brand emblem 39 is in the form of an "8." Filler members 41 and 43 are provided for filling the apertures in the "8." The cross-section of a jacket 45 is in the form of an "8" silhouette so that the brand emblem and the filler members can fit inside one end of the jacket 45. A back plate 47 also in the form of a figure "8" is provided for filling in the back side of the jacket 45. A nut 49 is attached to the back side of the plate and is adapted to fit onto the threaded end of a handle 51. The embodiment of the invention illustrated in FIG. 4 is used in the same manner as the embodiments of the invention heretofore described.

It will be appreciated by those skilled in the art and others that the invention provides an uncomplicated freeze branding iron suitable for widespread use. The branding iron is formed of a minimum number of components all of which are easily manufactured. Hence, the overall manufacturing cost of the branding iron is low. In addition, the branding iron is suitable for use with inexpensive coolants, such as a mixture of Dry-Ice and alcohol, as opposed to expensive refrigerants, such as nitrogen. Consequently, the cost per brand is greatly reduced over prior art freeze branding irons. In addition, the branding iron of the invention can be used continuously, hence, it overcomes the prior art disadvantages of interrupted use and registration problems.

While the invention has been described as using inexpensive refrigerants, it will be appreciated that expensive refrigerants such as nitrogen can be utilized if desired. In addition, it will be appreciated that a single handle can be utilized with a plurality of brand emblem containers or reservoirs. It will also be appreciated that the branding emblems illustrated in the drawings are merely illustrative and that other brand emblems, not necessarily numerals, may also utilize the invention.

The embodiments of the invention in which an exclusive property or privilege is claimed are defined as follows:

1. A freeze branding iron comprising:
   a container suitable for holding a refrigerant, said container having a brand emblem projecting outwardly from one side;
   a handle attached to said container;
   a jacket in the form of a loop having open ends;
   a brand emblem plate having said brand emblem projecting outwardly from one side, said brand emblem plate formed so as to fit into one end of said jacket; and,
   a back plate formed so as to fit into the other end of said jacket.

2. A freeze branding iron as claimed in claim 1 wherein said jacket and said back plate are formed of copper.

3. A freeze branding iron as claimed in claim 2 wherein said brand emblem plate is formed of high density copper and cast as a single unit.

4. A freeze branding iron as claimed in claim 3 wherein said handle is attached to said back plate.

5. A freeze branding iron as claimed in claim 1 wherein said brand emblem plate is formed of:
   a brand emblem; and
   filler elements adapted to fit into said brand emblem so as to give said brand emblem plate a configuration suitable for fitting into one end of said jacket.

6. A freeze branding iron as claimed in claim 5 wherein said brand emblem is formed of high density copper and cast as a single unit.

7. A freeze branding iron as claimed in claim 6 wherein said handle is attached to said back plate.

References Cited

UNITED STATES PATENTS

| | | | |
|---|---|---|---|
| 1,877,616 | 9/1932 | Strelitz | 62—293 |
| 3,358,648 | 12/1967 | Berens | 62—293 |
| 3,411,483 | 11/1968 | Cranoy | 62—293 |
| 3,485,060 | 12/1969 | Ziegler | 62—293 |

WILLIAM J. WYE, Primary Examiner

U.S. Cl. X.R.

119—1